Oct. 10, 1939.                E. BUGATTI                2,175,515
              COUPLING DEVICE FOR RAILWAY VEHICLES
                     Filed Oct. 4, 1934
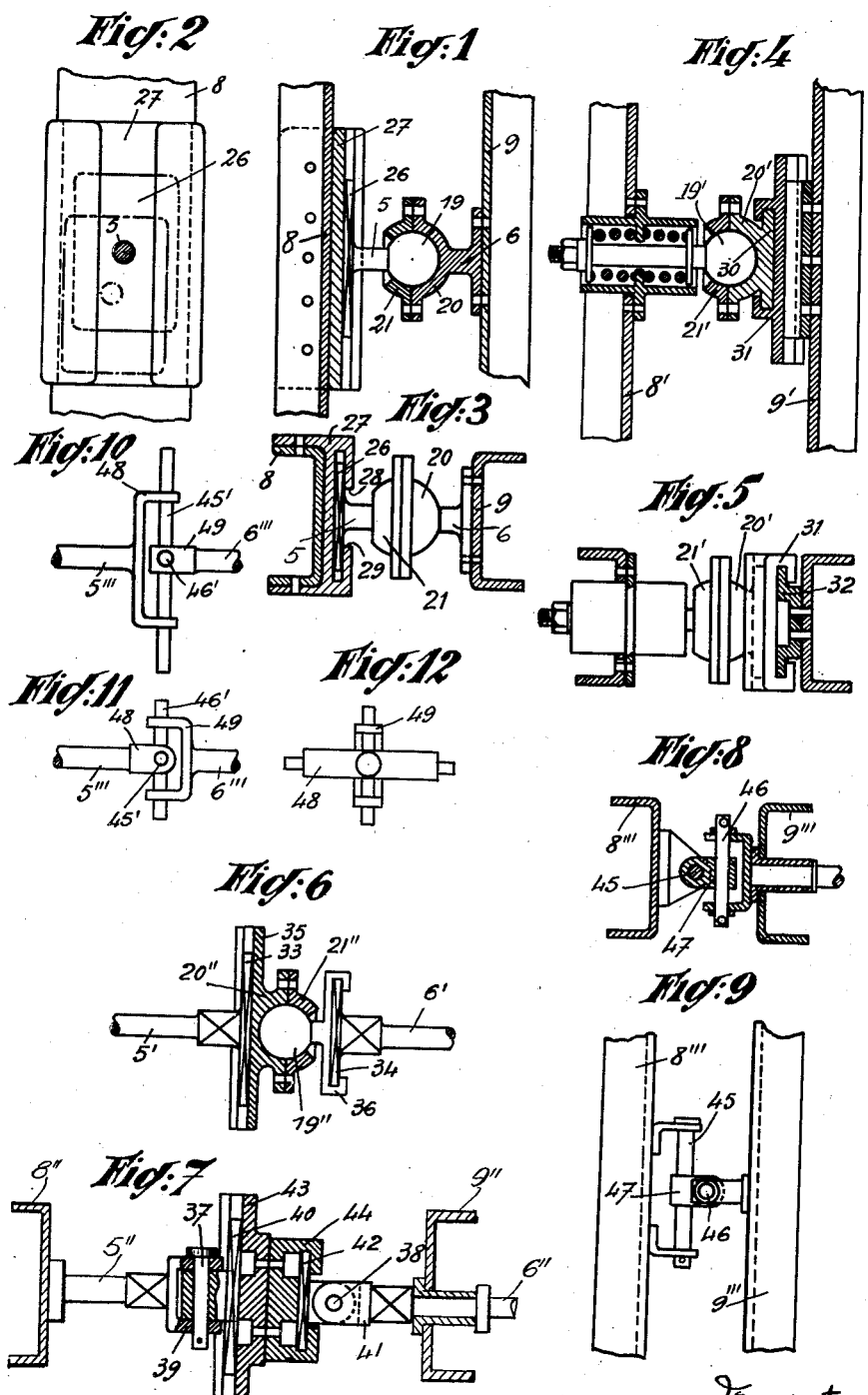

Patented Oct. 10, 1939

2,175,515

UNITED STATES PATENT OFFICE 2,175,515

COUPLING DEVICE FOR RAILWAY VEHICLES

Ettore Bugatti, Molsheim, France

Application October 4, 1934, Serial No. 746,887
In France October 10, 1933

12 Claims. (Cl. 213—74)

The apparatus for coupling two cars that are usually employed in railways include, on the one hand, the two draw hooks carried by the adjacent bumper beams and, on the other hand, a screw tightener fixed to one of the hooks by an axis of articulation and provided with a loop which is engaged in the other hook. It is a known fact that, in trains adapted to run at high speeds, the couplings must be tightly assembled, that is to say, in the state of rest, the springs of the bumpers must be compressed. From this arrangement it follows that two successive cars mutually influence themselves as to the nosing and rolling movements and this as well along straight lines as in curves.

The object of the present invention is to provide a coupling apparatus which materially improves the running of railroad vehicles on railway tracks. As a matter of fact, this apparatus is not exclusively applicable to railroad vehicles and might be also applied to road vehicles.

The essential feature of the coupling apparatus according to the present invention lies in the fact that it includes a universal joint, such as a ball and socket joint or a Cardan joint through which the connecting members of the coupling apparatus associated with the two vehicles to be coupled together are assembled, this joint being combined with one or more systems of slideways and sliding members interposed between the parts of the coupling apparatus and the corresponding cars, so as to ensure a certain mobility in the transverse direction, in the vertical direction or in both of these directions simultaneously. According to an embodiment of the present invention, the universal joint may be so devised as to insure the possibility of these relative displacements.

Preferred embodiments of the present invention will be hereinafter described with reference to the accompanying drawing, given merely by way of example, and in which:

Fig. 1 is a partial horizontal sectional view of the respective bumper beams of two cars coupled together and of the coupling apparatus through which these cars are assembled;

Fig. 2 is a horizontal front view of the beam that carries a slideway according to the present invention;

Fig. 3 is a partial vertical sectional view of the two beams;

Fig. 4 is a view analogous to Fig. 1 relating to another embodiment;

Fig. 5 is a view analogous to Fig. 3 corresponding to the embodiment of Fig. 4;

Figs. 6 and 7 are partial sectional views showing two types of universal joints combined with sliding systems. The rods 5″ and 6″ are attached to the transverse beams 8″, 9″ respectively which are similar to beams 8, 9 shown on Fig. 3.

Figs. 8 and 9 show, in vertical section and in plan view respectively, two beams coupled together by means of a Cardan joint of a special type;

Figs. 10, 11, and 12 are a plan view, a side view, and an end view, respectively, of another type of Cardan joint.

As shown in Figs. 1 to 6 inclusive, the coupling apparatus includes a ball and socket joint 19—20—21 for coupling together two cars the transverse front and rear beams of which are shown at 8 and 9 respectively.

In the embodiment of Figs. 1 to 3, the rod 6 that carries socket 20 is rigidly fixed to beam 9. The rod 5 that carries ball 19 is fixed to a sliding member 26 or made integral therewith. Member 26 is engaged in a slideway 27 carried by beam 8. The slot provided in the slideway for the passage of rod 5 not only permits the latter to move in the longitudinal direction but is limited by edges 28, 29 located at a distance from each other greater than the diameter of said rod, so as to permit vertical displacements (see Fig. 3) within given or chosen limits. If desired, this possibility of vertical displacements can be done away with. Of course, springs might be inserted in the coupling apparatus above described.

Figs. 4 and 5 show a coupling apparatus in which the socket 20′—21′ of the universal joint is connected through a double system of sliding members and slideways with beam 9′. The element 20′ of the socket is integral with a sliding member 30 adapted to move vertically, without any substantial play in the lateral direction, in a slideway 31. The latter in turn constitutes a sliding member adapted to move transversely, that is to say parallelly to beam 9′ owing to its sliding engagement with a guide 32 fixed to said beam.

It will be readily understood that this system of sliding joints might quite as well be provided between ball 19′ and beam 8′.

In the apparatus shown by Fig. 6, both of the rods 5′ and 6′ are provided with sliding members, 33 and 34 respectively, these members are slidable in slideways 35, 36 respectively, said slideways extending in directions at right angles to each other. For instance slideway 35 permits horizontal displacements and slideway 36 permits vertical displacements. One of these slideways carries ball 19″ while the other one carries the corresponding socket 20″—21″.

Instead of a ball and socket joint, a joint including two axes of articulation 37, 38 at right angles to each other, as shown in Fig. 7, may be employed. Pin 37 connects the fork-shaped member 39 of rod 5″ with a sliding member 40 and pin 38 connects the fork-shaped member 41 of rod 6″ with a sliding member 42. These sliding members 40, 42 are movable in slideways 43, 44 which can be connected together or belong to the same piece.

Figs. 8 and 9 show a coupling apparatus which includes two rods disposed at right angles to each other, one of these rods, 45, which is horizontal, being carried for instance by beam 8″, and the other one, 46, which is vertical, being mounted in a similar way on beam 9‴. These rods are connected together by a coupling piece 47 provided with holes at right angles to each other adapted to accommodate these rods respectively.

In the embodiment of the present invention shown by Figs. 10 to 12 inclusive, rods 45′, 46′ are adapted to slide in forks 48, 49 carried by rods 5‴ and 6‴ and form between them a cross-shaped member. Rods 45′, 46′ are made of a length corresponding to the degree of mobility that it is desired to obtain.

Of course, the coupling apparatus will be completed by various accessories such as lubricating devices, return devices if necessary, etc. All the apparatus above described may be combined with lateral stops or guides.

In a general manner, while I have, in the above description, disclosed what I deem to be practical and efficient embodiments of the present invention, it should be well understood that I do not wish to be limited thereto as there might be changes made in the arrangement, disposition and form of the parts without departing from the principle of the present invention as comprehended within the scope of the appended claims.

What I claim is:

1. An apparatus for coupling two railway cars together which comprises, in combination, a universal joint having two parts constructed and arranged solely for universal movement about the center of said joint, means including a substantially horizontal slide and slideway system disposed in a direction transverse to the path of travel of the cars, for connecting one of these parts of the joint to one of said cars, said means being constructed and arranged to hold the last-named part of the joint against relative pivotal movement with respect to the last-named car about a vertical axis, the slide having a substantial amount of vertical play in the slideway, and means for connecting the other part of the joint to the other car, the last named means being constructed and arranged to hold said other part of the joint against pivotal movement with respect to said other car about a vertical axis.

2. An apparatus for coupling together two railway cars having adjacent horizontal transverse beams, which comprises, in combination, a universal joint including two elongated members constructed and arranged solely for universal movement with respect to each other, means for securing one of said elongated members to one of said beams substantially at right angles thereto, and means for connecting the second elongated member to the second beam substantially at right angles thereto, the last mentioned means including a rigid, transversely and horizontally positioned, rectilinear slide having a smooth outer surface and a rigid, recessed member shaped to accommodate and embrace the slide to form therewith a traction resisting joint, the recessed portion having a smooth surface to allow free relative sliding movement of the slide and recessed member.

3. An apparatus for coupling together two railway cars having adjacent horizontal transverse beams, which comprises, in combination, a universal joint including two parts constructed and arranged solely for universal movement with respect to each other, means for connecting one of these parts to one of said beams, and means for connecting the other part with the other beam, the last mentioned means including a horizontally transverse slideway having a C-shaped cross section so as to open to the atmosphere through a slot, a substantially horizontal transverse slide adapted to operatively engage said slideway, and a rod solid with said slide extending substantially at right angles thereto so as to be horizontal and arranged longitudinally with respect to the path of travel of said cars, said rod projecting through said slot and having a diameter smaller than the width of said slot.

4. An apparatus for coupling two railway cars together which comprises, in combination, two pivot pins, one disposed vertically and the other horizontally and transversely to the path of travel of said cars, means for connecting one of the said pins to one of said cars independently of the other car, said means being constructed and arranged to hold said pin against pivotal movement about a vertical axis with respect to the corresponding car, means for connecting the other pin to the other car, independently of the first car, the last-named means being constructed and arranged to hold said other pin against pivotal movement about a vertical axis with respect to said other car, and rigid means for connecting said pins together constructed and arranged, in operation, to pivot about, and slide along, both of the pins.

5. An apparatus for coupling two railway cars together which comprises, in combination, a central member, means, constructed and arranged in operation both for pivotal movement about one substantially vertical axis and sliding movement along said axis with reference to said central member, for connecting it with one of the cars independently of the other car, and means, constructed and arranged, in operation, both for pivotal movement about a substantially horizontal axis extending transversely to the path of travel of said cars and for sliding movement along said substantially horizontal axis with respect to said central member, for connecting it with the other car independently of the first named car, the last named means being further constructed and arranged to hold the central member against relative pivotal movement about a vertical axis with respect to said other car.

6. A device for coupling two railway cars together which comprises two intermediate members; means for connecting said members together, constructed and arranged to enable, in operation, relative sliding movement of substantial amplitude between said members along a rectilinear path transverse to the path of travel of said cars; means for attaching one of the said intermediate members to one of the cars independently of the other car; means for attaching the other intermediate member to the other car independently of the first car; thus forming from and including one of the cars to and including the other car, a linkage of successive elements running from one of the cars to the other car; and means in said linkage for enabling relative universal movements of the ends of said linkage, irrespective of the relative sliding movements of said intermediate members, the last named means including at only one point throughout the linkage, means providing for pivotal movement about a vertical axis.

7. A device for coupling two railway cars together, which comprises two interconnected sections, each of which has its outer end attached to one of the cars independently of the other car, one section being divided into two subsections and including a part of a universal joint while the other section includes the complementary part of said universal joint, one of the two sub-sections including a rectilinear, rigid, end member having a smooth outer surface while the other sub-section includes a rectilinear, rigid, end member recessed to accommodate and embrace the first rectilinear rigid member, having a smooth surface in its recessed portion to allow free relative sliding movement of the two rectilinear members, the sub-section that constitutes the outer end of the section of which it is a part being so constructed and arranged that the rectilinear rigid member attached thereto lies in a substantially horizontal transverse direction with respect to the path of travel of the cars.

8. A universal joint having a linkage of successive interconnected members whereof only two successive members throughout the linkage are capable of relative pivotal movement about a vertical axis, the end members being each attached to one of two railway cars independently of the other car, thus forming a coupling device between said railway cars, one of the interconnected members being rigid and rectilinear and having a smooth outer surface while the next interconnected member is rigid and rectilinearly recessed to accommodate and embrace the first rectilinear member to form a traction resisting joint therewith, the recessed position having a smooth surface to allow free relative sliding movement of the two rectilinear members, the remainder of the successive interconnected members that link one of the rectlinear members to the railway car on the side away from the other rectilinear member being so constructed and arranged that the rectilinear member they connect with said car lies in a substantially horizontal transverse direction with respect to the path of travel of said car.

9. An apparatus for coupling two railway cars together which comprises, in combination, a first sliding member; means including a vertical pivotal joint, to connect the first sliding member with one of the cars independently of the second car adapted to hold said member in a vertical position; a second sliding member; means including a horizontal pivotal joint, to connect the second sliding member with the second car independently of the first car; a rigid intermediate member having two slideways at right angles to one another in sunken position with respect to opposed parallel faces thereof, the slideway being positioned and shaped to encase the sliding members respectively and form therewith traction resisting, sliding joints.

10. An apparatus for coupling two railway cars together which comprises a universal joint including two parts constructed and arranged solely for universal movement with respect to each other about the center of said joint; means for connecting one of the parts of the joint to one of said cars independently of the other car, said means being constructed and arranged to enable, in operation, sliding displacements of said part of the joint with respect to the first car along a substantially horizontal rectilinear path transverse to the path of travel of the cars and to hold the said part against relative pivotal movement with respect to the first car about a vertical axis; and means for connecting the other part of said joint to the other car, independently of the first car, the last-named means being constructed and arranged to hold the said other part of the joint against relative pivotal movement with respect to said other car about a vertical axis.

11. In a linkage of successive interconnected rigid members wherein the end members are structural parts of two adjacent railway cars and only two successive rigid members throughout the linkage are articulated together for relative pivotal movement about a vertical axis, the combination of means for connecting two successive rigid members in the linkage, arranged and constructed to enable in operation relative pivotal movement of the same about an horizontal axis; and means for connecting two successive rigid members in the linkage, arranged and constructed to enable relative sliding movements of substantial amplitude between said last-named members along a rectilinear direction transverse to the path of travel of said cars.

12. A device for coupling two railway cars together which comprises a rectilinear rigid member having a smooth outer surface; a second rectilinear rigid member recessed to accommodate and embrace the first rectilinear rigid member, having a smooth surface in its recessed portion to allow free relative sliding of the two rectilinear members; means for attaching one of the rectilinear rigid members to one of the cars independently of the other car; means for attaching the other rectilinear rigid member to the other car independently of the first car; thus forming from and including one of the cars to and including the other car a linkage of successive elements extending from one of the cars to the other, one of the attaching means being so constructed and arranged as to hold the corresponding rectilinear rigid member in a substantially horizontal transverse direction with respect to the path of travel of the cars; and means in said linkage for enabling relative universal movements of the ends of said linkage, irrespectively of the relative sliding movements of the intermediate members, the last named means including at only one point throughout the linkage, means providing for pivotal movement about a vertical axis.

ETTORE BUGATTI.